March 10, 1931.  W. H. MARTIN  1,795,497

WATER LEVEL CONTROLLING MEANS

Filed March 3, 1928  2 Sheets-Sheet 1

INVENTOR
Wm. H. Martin
BY
HIS ATTORNEY

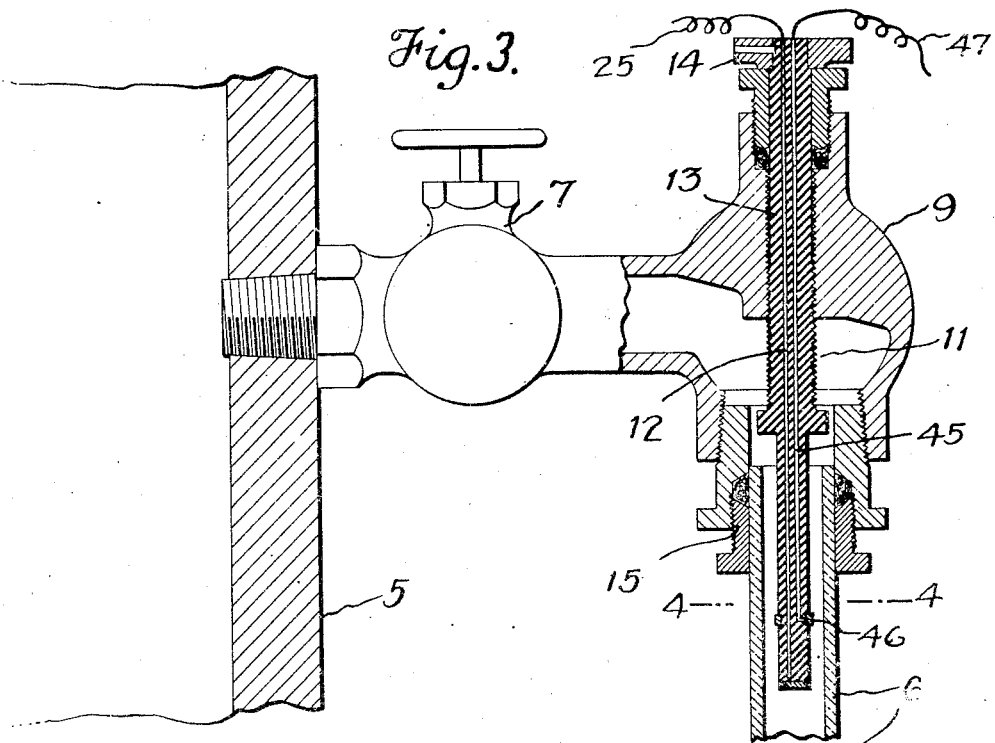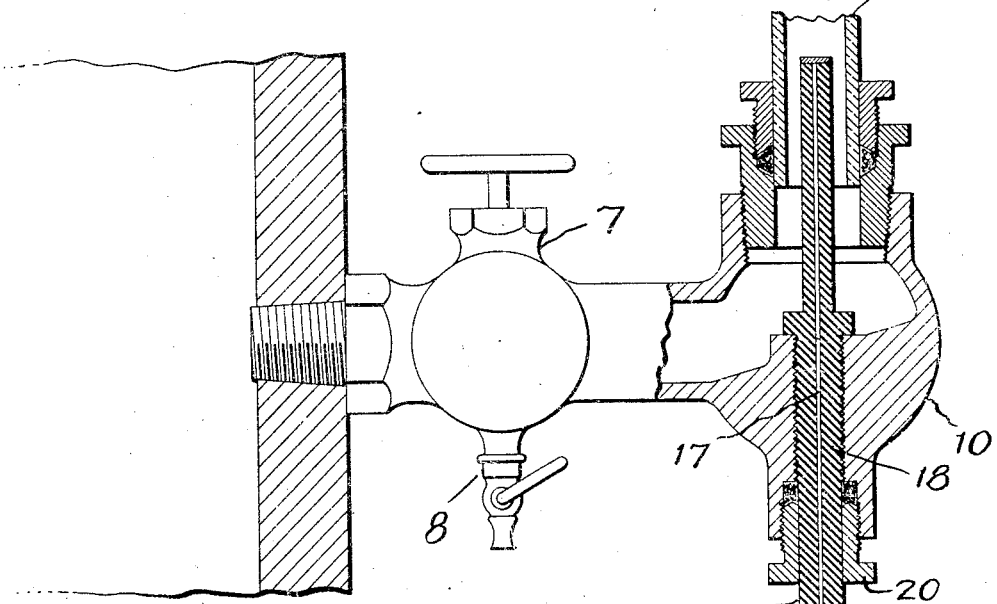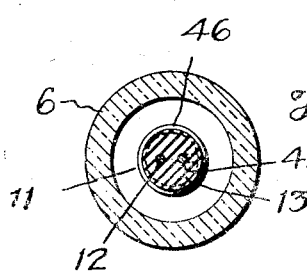

Patented Mar. 10, 1931

1,795,497

UNITED STATES PATENT OFFICE

WILLIAM H. MARTIN, OF NEWARK, NEW JERSEY

WATER-LEVEL-CONTROLLING MEANS

Application filed March 3, 1928. Serial No. 258,862.

The invention relates to a water level controlling means and has for its object to provide a new and improved means of extreme simplicity for automatically maintaining the water level in a steam boiler between two predetermined points.

The water in steam boilers, particularly those in home use, very often runs low due either to carelessness or to the fact that the connections to the gage glass become corroded and the height of the water in the gage glass is not a true reading of the amount of water in the boiler. If the water is allowed to run too low or become exhausted it will inevitably result in sections of the boiler being cracked or the entire boiler being ruined. If too much water is allowed to enter the boiler the heating system will not function properly or efficiently. The principal object of the present invention is to provide a simple and practical means of overcoming these serious conditions.

Various devices have been designed for this purpose and one of the most common is a float governed, electrically operated device in which the float upon rising to the top of its float chamber closes an electric circuit which energizes suitable devices to shut off a supply valve. A device operated on this principle has serious faults due to the fact that the float chamber must be of a fairly good size to accommodate the float and this results in the water in said chamber surging up and down particularly when it is boiling. This causes the switches at the top and bottom of the float chamber to be constantly turned on and off, thus making for considerable wear and tear on the apparatus and great annoyance to the user. It is also very advantageous to have the high and low water limits readily adjustable. To do this in a device built on the float principle it would be necessary to take down the entire apparatus to make the necessary adjustments.

In accordance with the present invention contacts or terminals are adjustably mounted in fittings on the top and bottom of a gage glass of small diameter. The gage glass being of small diameter will not permit the constant surging of the water in the boiler to be registered therein. The position of the contacts may be readily adjusted and no switches or moving parts are used in the contacts, thus providing a simple and efficient device. When the water in the gage glass drops below the lower contact a circuit is broken and a supply valve is opened. The supply valve remains open until the water reaches the upper contact which completes a circuit and causes suitable electrically operated instrumentalities to close the supply valve and said valve remains closed until the water again reaches the lower contact.

Further advantages will become apparent as this specification proceeds. In the accompanying drawings forming a part thereof a preferred embodiment of the invention is illustrated. Referring to said drawings:

Fig. 3 is a detail longitudinal sectional view, on a larger scale, of the gage glass and contacts in the upper and lower portions thereof. In this view parts are in elevation and parts are broken out for economy of space.

Fig. 4 is a detail cross-sectional view taken on line 4—4 of Fig. 3.

Figure 2:
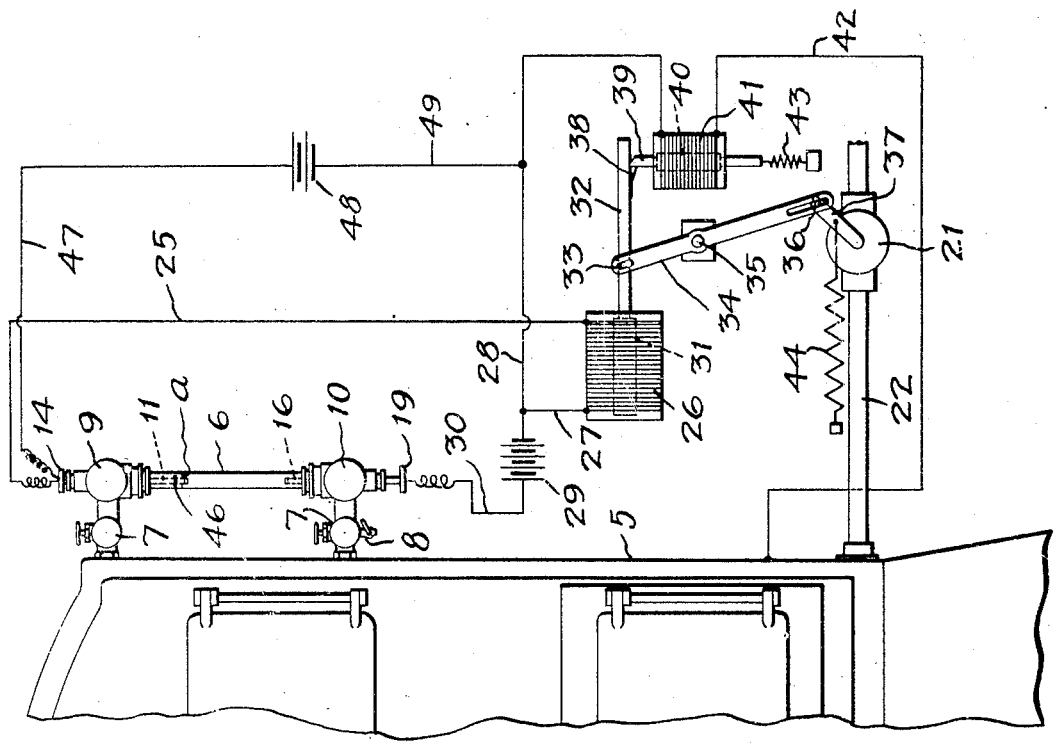
Fig. 2 is a similar view showing the parts in the position they would assume with the supply valve closed.

The reference numeral 5 designates a boiler of any conventional type having a gage glass 6 connected therewith. The usual valves 7 and petcock 8 may be provided. The gage glass 6 might extend between the valves 7 or, as illustrated special fittings 9 and 10 may be provided, adjacent the valves 7, and the gage glass located between said special fittings.

Mounted in the fitting 9 is a contact or terminal 11. The terminal 11 extends into the gage glass and comprises a conductor 12 surrounded by insulating material 13. It is exteriorly threaded for engagement with interior threads formed in the fitting 9 and is provided with a handle 14 on its outer end. It will thus be apparent that by rotating said handle the contact may be readily raised or lowered for adjustment purposes. A stuffing box 15 may be provided.

The lower fitting 10 has a similar terminal 16 adjustably mounted therein. This terminal or contact is likewise threaded into the fitting 10 and comprises the conductor 17 and insulating shell 18 having the handle 19 on its outer end. A similar stuffing box 20 may also be provided.

The gage glass 6 which extends between the fittings 9 and 10 is held in place in any suitable manner. It is an important feature of the invention that the gage glass be of small diameter. Because of the fact that the terminals 11 and 16 may be made quite slender due to their having no moving parts it is possible to use a small diameter gage glass and obtain the great advantages accruing therefrom as brought out in the introductory matter of the specification.

As illustrated the member 11 forms one terminal of what might be termed a normally open circuit and the member 16 forms one terminal of a normally closed circuit. The water in the gage glass and boiler is grounded and acts as the other leg of the circuits.

Suitable electrically operated instrumentalities are placed in the aforesaid mentioned circuits so that when the water drops below the level of the contact 16, and this normally closed circuit is opened, a valve 21 in a supply line 22 will be opened and remain open until the water reaches the contact 11 and closes this normally open circuit. The closing of this circuit energizes suitable electrically operated instrumentalities to close the valve 21. The form and arrangement of these electrically operated instrumentalities may be widely varied and that illustrated in the drawings typifies only one of the numerous ways in which the desired result may be accomplished.

The contact 11 has the lead 25 to the solenoid 26. The current passes from the lead 25 through the coil of the solenoid 26 and through wire 27 which is connected to wire 28. Wire 28 runs to the battery or source of electric energy 29 which is connected by wire 30 to contact 16.

When the water rises in the gage glass to the level indicated at $a$ in Fig. 2 the circuit just described which is the normally open circuit, will be closed and the core 31 of the solenoid will be centralized. Attached to the core 31 is a member 32 which has a slotted connection 33 with a lever 34. This lever 34 is pivoted at 35 and has another slotted connection 36 with the handle 37 of the valve 21. It will thus be apparent that valve 21 will be closed when the solenoid 26 is energized.

When the water drops away from the contact 11 the solenoid 26 becomes dead and other means are necessary to keep the valve 21 in its closed position until the water drops below the contact 16. This is accomplished by means of latch 38 on the member 32, said latch being engaged by a locking member 39 on the core 40 of a solenoid 41. The solenoid 41 is in what is termed the normally closed circuit. Lead 28 from the battery and contact 16 brings the current to the coil of the solenoid 41, from whence it passes through wire 42 to the boiler where it is grounded. It will thus be plain that solenoid 41 is always energized except at such times as the water falls below contact 16, or to the level indicated at $b$ in Fig. 1.

Figure 1:
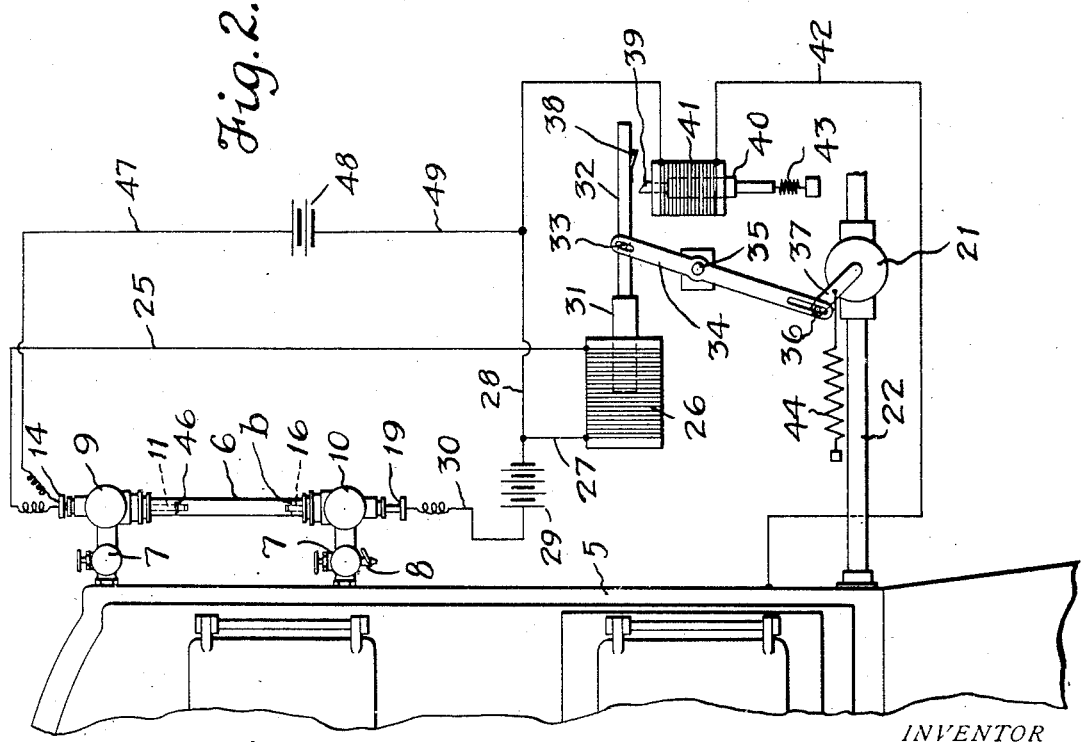
Fig. 1 is a diagrammatic view showing the parts in the position they would assume when the water supply valve is open.

When the water in the gage glass drops below contact 16, to the level indicated at $b$ in Fig. 1, solenoid 41 becomes deenergized and spring 43 will pull the core 40 to the position shown in Fig. 1. The lock 39 being disengaged from the latch 38 the spring 44 will open the valve 21 and same will remain open until the water in the boiler has been replenished and reaches the contact 11 at which time the solenoid 26 will again be energized and close the valve 21 as previously explained.

The source of electrical energy indicated at 29 may be a battery or leads from the house circuit or other appropriate supply. In the event of a fuse being blown or the battery 29 going dead the supply valve 21 would be opened. Suitable means may be provided so that in case of an emergency of this description the water would not flood the entire heating system.

The upper terminal 11 has an additional conductor 45. This conductor is connected to a band 46 which is located at a point above where the conductor 12 contacts with the water in the gage glass. Connected to the conductor 45 is a lead 47 to an auxiliary battery 48. Another wire 49 connects this auxiliary battery to the wire 28. With this arrangement, if for any reason the battery 29 does not function the auxiliary battery 48 will energize the electrical instrumentalities and shut off the valve 21 when the water reaches the band 46 connected to the conductor 45.

Numerous changes in arrangements of parts and details of construction may be made without departing from the spirit of the invention as set forth in the appended claim.

What I claim as new is:

A water level controlling means having in combination, a gage glass of small diameter connected to a boiler, fittings on the top and bottom of said gage glass, a vertically adjustable contact entering the upper part of said gage glass, said contact insulated from said top fitting and forming one terminal of a normally open circuit, another adjustable contact entering the lower part of said gage glass and forming one terminal of a normally closed circuit, a valved water suply line leading to said boiler, and suitable electrically operated instrumentalities so arranged that when the water in said gage glass drops below said lower contact the supply valve in the water line' leading to said boiler will be opened, and when said water rises to said upper contact said supply valve will be closed.

In testimony whereof I affix my signature.

WILLIAM H. MARTIN.